United States Patent Office 3,069,381
Patented Dec. 18, 1962

3,069,381
PROCESS FOR PREPARING SEGMENTED
COPOLYMERS
Kenzie Nozaki, El Cerrito, Calif., assignor to Shell Oil
Company, a corporation of Delaware
No Drawing. Filed Dec. 7, 1953, Ser. No. 396,735
17 Claims. (Cl. 260—45.5)

This invention relates to a process for preparing copolymers of ethylenically unsaturated organic compounds. More particularly, the invention relates to a process for preparing segmented copolymers from a certain special type of ethylenically unsaturated monomer, to the new copolymers so produced, and to their use, particularly as tailor-made lubricants, detergents, plasticizers, and the like.

Specifically, the invention provides a practical and economical method for preparing copolymers having a segmented structure, i.e., having a segment of one polymer joined through a primary chemical bond to a segment of a dissimilar polymer, which comprises polymerizing, preferably in the substantial absence of molecular oxygen, a special type of ethylenically unsaturated monomer capable of forming long-lived polymer free radicals as described hereinafter in a liquid medium which is a poor solvent for the polymer of that monomer and when substantially no unpolymerized ethylenically unsaturated monomer remains in the reaction mixture adding a dissimilar non-thermally polymerizable monoethylenically unsaturated monomer to the reaction mixture, preferably intermittently or continuously over a period of time, and continuing the polymerization in the dark at a temperature below 100° C. until the dissimilar monomer is polymerized.

Attempts have been made in the past to improve the properties of many of the homopolymers of the unsaturated monomers by copolymerizing the said monomers with various dissimilar compounds, the homopolymers of which display the desired superior properties. These copolymers have been prepared heretofore by merely mixing the unsaturated compound with the desired dissimilar monomer and then subjecting the resulting mixture to polymerization conditions, such as heat, light and catalysts. When combined under these conditions, the two monomers usually add to the polymer chain in a more or less random fashion and the resulting polymer chains are made up of a very complicated arrangement of the two kinds of monomers. Copolymers prepared from monomers A and B, for example, will have the A and B units arranged in such order as ABAABBBABBABBA. This method of producing the desired copolymers is not entirely satisfactory. It has been found, for example, that when the monomer units are distributed throughout the copolymer chains in the above-described manner they fail to impart the properties of their corresponding homopolymers and the resulting copolymers in many cases possess an entirely different set of properties. Furthermore, as there is no definite control over the order in which the monomers add to the polymer chain, the copolymers produced by this process rarely, if ever, have the same molecular structure of physical properties, and standardization of the copolymers and their application is quite difficult.

It is an object of the invention to provide a process for producing a new kind of copolymer. It is a further object to provide a process for preparing copolymers which retain many of the important characteristics of the homopolymers of the monomers making up the said copolymers. It is a further object to provide a copolymerization process which yields substantially the same type of product in each operation. It is a further object to provide a method for preparing a new type of copolymer having many unusual and beneficial properties. It is a further object to provide a method for preparing new copolymers which have unexpected solution behavior. It is a further object to provide a method for preparing copolymers which have excellent solubility in both water and oils and may be used as tailor-made lubricants, detergents, plasticizers, and the like. It is a further object to provide a method for preparing copolymers which are pre-plasticized and may be cast, molded or otherwise formed into shaped articles having good strength and flexibility without the external addition of plasticizing materials. These and other objects of the invention will be apparent from the following detailed description thereof.

It has now been discovered that these and other objects may be accomplished by the process of the invention which comprises polymerizing, preferably in the substantial absence of molecular oxygen, a special type of ethylenically unsaturated monomer of the group consisting of monomers having the formula

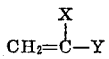

wherein X is a halogen or aliphatic hydrocarbon radical and Y is a monovalent organic radical having the free bond of the radical attached to carbon and monomers having a terminal methylene group joined to an aliphatic carbon atom through an ethylenic linkage which is in conjugated relationship with another ethylenic linkage, which monomers are capable of forming long-lived polymer free radicals, in a liquid medium which is a poor solvent for the polymer of that monomer and when substantially no unpolymerized ethylenically unsaturated monomer remains in the reaction mixture adding a dissimilar non-thermally polymerizable monoethylenically unsaturated monomer to the reaction mixture, preferably intermittently or continuously over a period of time, and continuing the polymerization in the dark at a temperature below 100° C. until the dissimilar monomer is polymerized.

The above process is based in part upon the unexpected discovery that when members of the above-described group of ethylenically unsaturated monomers are polymerized under certain specific conditions indicated hereinafter they are able to form polymer nuclei which continue to exist as free radicals even after the monomer has been consumed and the energy source has been removed. When a dissimilar monomer is added to the reaction mixture containing these long-lived polymer free radicals the said monomers add to the polymer nuclei in the ordinary manner.

As the initial free radicals are already present, there is no need of maintaining conditions necessary for the formation of free radicals of this dissimilar monomer and the conditions employed after the addition of that monomer may be those which would effect no polymerization of the dissimilar monomer. This feature is of great advantage as it avoids the formation of homopolymer nuclei of the dissimilar monomer under the copolymerization and thereby gives a product made up substantially of the desired segmented copolymer.

The process of the invention thus accomplished the unexpected and surprising feat of effecting polymerization of unsaturated monomers under conditions which ordinarily would not give rise to such polymerization.

The products produced by the above-described process are unique in that they possess a segmented structure, i.e., they are made up of two distinct segments or sections joined end to end, such as A–B, wherein section A is made up entirely of the initial ethylenically unsaturated monomer forming the long-lived polymer free radicals and section B is made up substantially of the dissimilar monomer added to the mixture containing the long-lived polymer free radicals. As the monomer units are grouped together in one section of the novel copolymers and are not distributed throughout the entire polymer chain, the said monomer units are able to impart many of the properties of their corresponding homopolymers, and the final product will have many of the desired characteristics of the homopolymers of the monomers utilized in their production.

The above-described process is of particular advantage in producing copolymers which are tailor-made for or can be easily adapted for certain special industrial applications. With the process, for example, it is possible to prepare copolymers which have or can be easily converted to products which possess varying solubilities in both oil and water and are, therefore, ideally suited for use as specialized lubricants or additives for lubricating compositions, and as detergents, emulsifying agents, wetting agents, and the like. For example, polymers having solubility in water and oil may be obtained by the above-described process by employing a monomer, such as isoprene, to form the long-lived polymer free radicals, and as the unsaturated dissimilar monomer, a monomer as vinyl acetate, which has groups which may be converted to other groups having water-soluble characteristics, or such polymers may be obtained by using a monomer with groups that may be converted to water-solube groups, such as methacrylontrile, or methyl methacrylate, as the ethylenically unsaturated monomer which forms the long-lived polymer free radicals, and then using a long-chain ester, such as vinyl stearate as the dissimilar monomer to form the component having the desired solubility in oil. Copolymers of this type are particularly useful as detergents and as dispersing agents for preparing suspensions and emulsions of various components, such as metal oxides, that will not be precipitated either in aqueous or hydrocarbon systems.

Still another important application of the process of the invention is its use in the preparation of "internally" plasticized polymers, i.e., polymers wherein the plasticizer is joined to the polymer through a primary chemical bond. The production of this type of polymer is accomplished by selecting as the monomer capable of forming the long-lived polymer free radicals one which forms a soft, flexible polymer, and then adding as the dissimilar monomer one that will form a harder more brittle polymer, such as vinyl chloride, or the monomer forming the long-lived polymer free radicals may be one that forms the hard brittle polymer and the dissimilar monomer one that forms a softer, more flexible polymer. In either case, the resulting product is one that possesses a softer more flexible polymer segment which tends to plasticize the copolymer product. As the plasticizer is chemically bound in the molecule, there is no danger of its loss through migration or volatilization.

As indicated above, the monomers to be used in preparing the long-lived polymer free radicals comprise the monomers of the formula

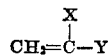

wherein X is a halogen or an aliphatic hydrocarbon radical and Y is a monovalent organic radical which has the free bond of the radical attached to a carbon atom and monomers having a terminal methylene group joined to an aliphatic carban atom through an ethylenic linkage which is in conjugated relationship with another ethylenic linkage. Examples of this particular group of monomers include, among others, 2-chloropropene-1, 2-chlorobutadiene - 1,3, 2 - chlorobutene - 1, alpha - chlorostyrene, isoprene, butadiene, dimethylbutadiene, methallyl chloride, methallyl acetate, ethallyl benzoate, alpha-chloroallyl caproate, dimethallyl phthalate, 3-methallylcyclohexanone, alpha-chloroacrylonitrile, butyl 4 - chloro-4-pentenoate, ethyl alpha-bromacrylate, alpha - methyl-4-methoxystyrene, alpha - methoxystyrene alpha - acetyl-alpha-cyanostyrene, alpha-ethenylstyrene, 2 - ethenylbutene-1, butyl alpha - chloroacrylate, 2-bromo -1-hepten-3-one, 4-methallyl benzonitrile, 4-chloro-4-pentenamide, N-phenyl - 4 - methyl - 4 - pentenamide, N - cyclohexyl - 4 methyl-4-pentenamide, 4-amyl-4-pentenamide, 4-butyl-4-penten-2-one, 4-iodo-4-pentenamide, N-butyl-4-chloro-4-pentenamide, 3-fluoro - 3 - butenenitrile, 3-chloro-3-butenenitrile, 5-isopropyl-5-hexenenitrile, 4-methallyl-1-acetoxybenzene, 4-carbamyl-2-butyl-1-butene, alpha-methylvinylcyclopentane, 4-carboxy-2-chloro-1-pentane, 4-methallylbenzamide, 3-alpha-methylvinylcyclohexenamide, 7-ethallyl-2-naphthamide, 3-ethallyl-1-acetylbenzene, and 4-methoxyl-4-pentenamide.

The preferred monomers to be utilized in the process of the invention are those monomers of the formula

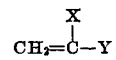

wherein X is a halogen or alkyl radical and Y is a monovalent radical having the free bond of the radical joined to carbon and possessing a grouping which activates polymerization, preferably within 5 carbon atoms of the double bond, as —COOH, —COOH substituted radicals, carbalkoxy radicals and carbalkoxy-substituted radical, ester radicals as

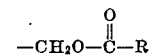

radicals (wherein R is a hydrocarbon radical) ester substituted radicals as

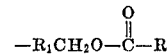

radical (wherein R₁ is a bivalent hydrocarbon radical), cyano and cyano - substituted radicals, the amide and amide-substituted radicals, ketone radicals as

radicals (wherein R is a hydrocarbon radical), ketone substituted radicals as

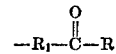

radicals (wherein R₁ is a bivalent hydrocarbon radical), ether radicals as —CH₂OR radicals (wherein R is a hydrocarbon radical), and ether-substituted radicals as —R₁CH₂OR radicals (wherein R₁ is a hydrocarbon radical), and the alkenyl radicals. These preferred monomers may be exemplified by butyl 2-methyl-2-propenoate, ethyl 3-methyl-3-butenoate, isobutyl 4-ethyl-4-pentenoate, amyl 4-butenyl-4-pentenoate, methallyl actetate, ethallyl benzonate, dimethallyl phthalate, 2-methyl-2-propenenitrile, 3-hexenyl-3-butenenitrile, 4-butyl-4-pentenenitrile, 3-ethallyl-2-napthamide, 5-isopropyl-5-hexenenitrile, 2 - methyl-2-propenamide, 3 - ethyl-3butenamide, 3-hexenyl-3-butenamide, 4-isobutyl-4-pentenamide, 4-amyl-4-pentenamide, 3-methyl-3-buten-one, 3-ethyl 3-buten-2-one, 4-butyl-4-penten-2-one, 4-isopropyl-4-penten-3-one, 5-amyl-5-penten-2-one, and 5-ethyl-5-penten-4-one.

A particularly preferred group of vinyl-type monomers are those of the general formula

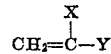

wherein X is a member of the group consisting of halogen atoms and alkyl radicals and Y is a member of the group consisting of —(CH₂)ₙCN radicals

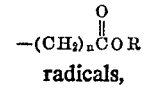

radicals,

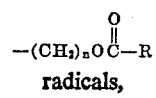

radicals,

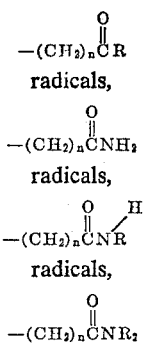

radicals, and alkenyl radicals, the $n$ in the foregoing radicals being an integer from 0 to 5 and R being a hydrocarbon radical, preferably an alkyl radical containing from 1 to 8 carbon atoms. Examples of this particularly preferred group of monomers are methacrylonitrile, methyl methacrylate, methallyl acetate, methallyl octanoate, methyl-isopropenyl ketone, 4-ethyl-4-pentenoate, 4-amyl-4-pentenoate, 4-butyl-4-pentenenitrile, 4-chloro-4-pentenoate, 4-isobutyl-4-pentenamide, N-cyclohexyl 4-isobutyl-4-pentenamide, 4-amyl-4-pentenamide, 3-chloro-3-buten-2-one and N,N-dibutyl 4-butyl-4-pentenamide, and 4-isopropyl-4-penten-3-one.

The dissimilar monomer to be added to the polymer free radicals formed from the above-described monomers are the non-thermally polymerizable monoethylenically unsaturated monomers dissimilar to the said monomers forming the long-lived polymer free radicals. The expression "non-thermally polymerized monomers" as used herein refers to those monomers which do not form polymers, i.e., products made up of more than 2 units of the monomer, when they are exposed in the pure state in the absence of molecular oxygen to a temperature up to 100° C. Monomers that fall into this category may be easily determined by carefully distilling the monomer, placing the monomer in a carefully cleaned Pyrex tube, removing the oxygen from the tube, sealing it and heating the tube up to 100° C. in the dark for, say, several days, and then analyzing the product for the presence of polymer.

Examples of the above-described group of non-thermally polymerizable monoethylenically unsaturated monomers include, among others, acrylonitrile, methacrylonitrile, ethacrylonitrile, vinyl chloride, vinyl acetate, vinyl caproate, vinyl stearate, octene-1, butylene, allyl acetate, allyl butyrate, diethyl maleate, dibutyl maleate, dioctyl maleate, octyl lauryl maleate, lauryl acrylate, allyl methyl phthalate, vinyl butyl succinate, and the like.

Preferred members of the non-thermally polymerizable monoethylenically unsaturated monomers include those of the group consisting of alpha,beta-ethylenically unsaturated aliphatic nitriles, vinyl halides, alkyl esters of maleic acid, alkenes, vinyl esters of saturated monocarboxylic acids, allyl esters of saturated monocarboxylic acids, vinyl and allyl esters of acid esters of polycarboxylic acids and saturated monohydric alcohols and esters of saturated monohydric alcohols and acrylic acid.

According to the process of the invention, one first polymerized the above-described special type of ethylenically unsaturated monomer under the conditions needed to form the long-lived polymer free radicals and then when substantially all of that monomer has been consumed adding the above-described non-thermally polymerizable dissimilar monomer.

The formation of the long-lived polymer free radicals occurs when precipitation or gelation of the polymer takes place. It is necessary, therefore, that the polymerization of the special unsaturated monomers be accomplished in a medium which is a relatively poor solvent for the finished polymer. Many of the special unsaturated monomers are relatively insoluble in water and the polymerization is preferably conducted in an aqueous emulsion or suspension system. Some of the polymers of these monomers are, however, insoluble in solvents, such as cyclohexane, butane, hexane, and benzene and the polymerization may also be conducted in the presence of such solvents. Many of the polymers are also insoluble in the monomer so bulk polymerization may also be utilized in the preparation of the long-lived polymer radicals.

Heat, light and polymerization catalyst and any combination thereof may be utilized to initiate the polymerization. If polymerization catalysts are employed, they should be utilized in only relatively small amounts as high catalyst concentrations are detrimental to the formation of the long-lived polymer free radicals. Examples of polymerization catalysts that may be employed are the peroxides, such as benzoyl peroxide, acetyl peroxide, hydrogen peroxide, tert-butyl peroxide, the peracids, such as persulfuric acid, peracetic acid, and perphthalic acid, the per-salts, such as potassium persulfate, the peresters, such as tert-butyl perbenzoate, and the like. Mixtures of catalysts may also be used. The amount of the catalyst, in general, should not exceed 1.5% by weight of the monomer being polymerized but the exact amount of catalyst that can be tolerated in the process may best be calculated for each individual case by a few routine determinations.

Light rays, preferably those in the ultraviolet portion of the spectrum may also be used to initiate the polymerization of the initial monomer.

Temperatures that may be employed in the polymerization of the special unsaturated monomers may vary over a considerable range depending upon the type of monomer being polymerized, presence or absence of catalyst, etc. If catalysts are employed, the temperature will depend upon the decomposition temperature of the catalysts. If no catalyst is employed, the temperature will usually be governed by the type of monomer being polymerized. In general, temperatures between 20° C. to 150° C. will be sufficient to bring about the desired formation of long-lived polymer free radicals. Preferred temperatures vary from about 40° C. to about 90° C. Atmospheric, superatmospheric, or subatmospheric pressures may be utilized as desired.

In most cases, molecular oxygen will tend to inhibit long-lived polymer free radical formation and it is desirable to exclude the said oxygen from the reaction. The removal of the oxygen may be accomplished by any suitable method. It is preferably accomplished by freezing the mixture and evacuating the reaction chamber by suitable means. In some cases, it may be desirable to replace the withdrawn oxygen with an inert gas, such as nitrogen, methane, carbon dioxide, and the like.

Various types of additives may be added to the reaction mixture before or any time during the initial polymerization step provided the addition does not interfere with the formation of or destroy the already formed long-lived polymer free radicals. These additives include emulsion stabilizers, lubricants, dyes, photosensitizers, plasticizers, and the like. The nature and amount of the additive will depend upon the monomer being polymerized and the intended use of the final product.

The polymerization of the initial monomer is continued until there is substantially no unpolymerized monomer present in the reaction mixture. This may be accomplished by continuing the polymerization until it appears that substantially all of the monomer has been polymerized, or alternatively, by interrupting the polymerization at any stage in the process and removing substantially all of the unpolymerized monomer from the reaction mixture by conventional means. A polymerization of 100% of the monomer, or a complete removal of all of the unpolymerized monomer is usually quite difficut to obtain as in many cases some of the monomer will be retained within the polymer chain, etc. Therefore, the expression "substantially all" as used throughout the specification and claims in regard to the polymerization of the initial monomer, or the removal of the unpolymerized initial monomer from the reaction mixture is meant such a complete removal or polymerization as can generally be accomplished, e.g., a polymerization of at least 94% of the initial monomer, or a removal of all but 6% or less of the unpolymerized monomer.

After the reaction mixture containing the polymer free radicals of the special unsaturated monomers has been substantially freed of the basic monomer, the above-described non-thermally polymerizable dissimilar monomer is then added. The monomer added may be a single dissimilar monomer or a mixture of two or more of the monomers may be employed. The monomer or monomers selected are preferably deoxygenated before being added to the freshly prepared medium containing the long-lived polymer free radicals.

If the dissimilar monomer to be added is one which is unable to form long-lived polymer radicals, it is preferably added to the reaction mixture intermittently or continuously over a period of time so as to not build up a large amount of the monomer in the reaction mixture at one time. More specifically, the dissimilar monomer is preferably added at about the rate at which it is consumed in the reaction mixture.

The amount of the dissimilar monomer added will depend upon the ratio in which the said monomers are desired in the final product. Thus, for example, if the desired product is a copolymer of 25% polymethacrylonitrile and 75% methyl methacrylate, the amount of the methyl methacrylate added to the active polymethacrylonitrile will be about three times the amount of the active polymer.

After the non-thermally polymerizable monomer has been added to the freshly prepared composition containing the long-lived polymer free radicals, the reaction mixture is maintained in the dark at a temperature below 100° C., and preferably between 75° C. and 100° C. Particularly preferred temperatures range from 25° C. to 50° C. As the dissimilar monomers are not thermally polymerizable at these temperatures, there is no formation of new homopolymer nuclei of these monomers and the monomer adds only to the initially formed polymer free radicals.

The polymerization of the added dissimilar monomer is accomplished in the absence of the molecular oxygen, at least during the initial stages of the reaction. In some cases it may be desirable to replace the withdrawn oxygen with an inert gas, such as nitrogen, methane, carbon dioxide and the like. Atmospheric, superatmospheric and subatmospheric pressures may be used.

It may also be desirable to add various additives before or at any time during this latter polymerization step. These additives include emulsion stabilizers, lubricants, dyes, plasticizers, and the like. The type and amount of the additive will depend upon the monomer being polymerized and the intended use of the final product.

If the dissimilar monomer added to the active polymer nuclei is a monomer of the special group described above which is capable of forming long-lived polymer free radicals and the conditions employed are those conducive to the formation of long-lived polymer free radicals, the copolymer produced by the process will, in turn, be a long-lived polymer free radical and a third dissimilar monomer may be added to form a three component copolymer A—B—C, wherein A is a section made up entirely of the initial monomer, B is a section made up of the second monomer, and C is a section made up of the third dissimilar monomer. The process may be continued in the same manner to form a four, five, six, etc., component copolymer providing the above-described conditions are maintained.

At the completion of the reaction the copolymers may be separated from the reaction mixture by any suitable means, such as filtration, coagulation, and the like.

It is preferred to accomplish the process of the invention in an aqueous emulsion as the required conditions for producing the long-lived polymer free radicals are more easily obtained by that method. According to the preferred method of operation the special ethylenically unsaturated monomer is combined with a mixture of water and emulsifying agent, the resulting mixture is exposed to heat and/or light to polymerize the said special monomer and the dissimilar monomer is then added and the polymerization continued.

Emulsifying agents that may be employed in the preferred process include the soaps, such as sodium and potassium myristate, laurate, palmitate, oleate, stearate, rosinate and hydroabietate; the alkali metal alkyl or alkylene sulfates, such as sodium lauryl sulfate, potassium stearyl sulfate, the alkali metal alkyl or alkylene sulfonates, such as sodium lauryl sulfonate, potassium stearyl sulfonate, and sodium cetyl sulfonate, sulfonated mineral oil, as well as the ammonium salts thereof, and salts of higher amines as lauryl amine hydrochloride and stearyl amine hydrobromide.

The amount of the emulsifying agent to be employed in the polymerization mixture will vary over a considerable range depending upon the particular material being polymerized, the amount of water present in the mixture and the type or amount of other ingredients added thereto. In general, the amount will vary from 0.1% to 5% by weight of monomer. The preferred amount of emulsifying agent to be employed will vary between .1% to 1% by weight of monomer.

It is usually desirable to maintain a low ratio between the amount of monomer and amount of water present in the initial aqueous emulsion, e.g., between 1:2 and 1:5, preferably 1:3. With lower phase ratios there is more monomer available per long-lived radical and the polymer chain is able to grow to a higher molecular weight.

Any of the above-described polymerization catalysts may be used in the aqueous emulsion in the polymerization of the initial monomer, such as benzoyl peroxide, acetyl peroxide, hydrogen peroxide, tert-butyl peroxide, potassium persulfate, tert-butyl perbenzoate, and the like. The amount of the catalyst, in general, should not exceed 1.5% by weight of the monomer being polymerized by the exact amount of catalyst that can be tolerated in the reaction may best be calculated for each individual case by a few routine determinations.

Temperatures employed in the polymerization of the initial monomer in the aqueous emulsion will generally vary between 40° C. and 100° C., preferably between 50° C. and 75° C. Light rays, e.g., those having wave lengths of 1800 to 5000 Angstroms, may also be used in the polymerization of the initial monomer.

The conditions employed in the aqueous emulsion polymerization process after the addition of the dissimilar monomer will be those disclosed for these stages of the process in the above-described description of the general process of the invention.

The copolymers will be formed in the aqueous emulsion as a latex which may be separated by any suitable means, such as coagulation with electrolytes, solvents, freezing, and the like.

The copolymers produced by the process of the invention will have properties closely relating to those of the homopolymers of the monomers contained in the said copolymers. As the properties may be conveniently predicted in most cases by a proper selection of monomers the copolymers may be produced to fit substantially any desired industrial application. As indicated above, copolymers may be made by the process for use as lubricants, detergents, wetting agents, plasticizers, or for use in preparing shaped articles. The copolymers also find use in the preparation of surface coating compositions, laminating and impregating compoitions, and the like.

To illustrate the manner in which the invention may be carried out, the following examples are given. It is to be understood, however, that the examples are for the purpose of illustration and the invention is not to be regarded as limited to any of the specific conditions cited therein.

In the following examples the deoxygenation was accomplished by freezing the mixture in liquid nitrogen, evacuating on an oil pump, melting, and repeating the step three more times.

The irradiation was accomplished by placing the reaction chamber constructed of soft glass about one inch away in air from a General Electric H-5 lamp from which the Pyrex jacket had been removed.

The copolymers were coagulated by freezing at −20° C. or by precipitation with sodium chloride at 90° C.

Parts described in the examples are parts by weight.

Example I

This example illustrates the use of the process of the invention in preparing a segmented copolymer made up of a segment of polymeric methyl methacrylate joined to polymeric methacrylonitrile, and further demonstrates the unexpected nature of the results so obtained.

(A) About 100 parts of methyl methacrylate were mixed with 600 parts of water and 0.33% sodium lauryl sulfate and the mixture deoxygenated. The resulting mixture was heated at 50° C. in the dark until substantially all of the methyl methacrylate was polymerized. 100 parts of deoxygenated methacrylonitrile were then added and the polymerization continued in the dark at 50° C. until substantially all of the methacrylonitrile was polymerized. Analysis indicated that the resulting product was a copolymer made of 100 parts of polymeric methacrylonitrile. No homopolymer of methacrylonitrile was detected in the reaction mixture.

(B) Methacrylonitrile could not polymerize by itself under the above-described conditions so it was quite unexpected to find that it did polymerize in the presence of the methyl methacrylate polymer nuclei. The inability of the methacrylonitrile to polymerize under the above conditions is demonstrated by the following experiment. 100 parts of methacrylonitrile were placed in 600 parts of water and 0.33% sodium lauryl sulfate and the mixture deoxygenated. The mixture was then heated at 50° C. in the dark in the absence of oxygen for several days but no polymer was formed during that period. Similar experiments conducted at about 100° C. indicated that the methacrylonitrile could not homopolymerize under the disclosed conditions even at that high a temperature.

As methacrylonitrile could not have polymerized by itself under the above-described conditions, its polymerization could be explained only by the fact that the methacrylonitrile units added to the active methyl methacrylate polymer nuclei. The resulting copolymer was also completely insoluble in benzene which is a good solvent for polymethyl methacrylate but not for polymethacrylonitrile. This is further evidence that the methacrylonitrile units were added to the methyl methacrylate polymer nuclei.

(C) The experiment reported in (A) above is repeated with the exception that after the methacrylonitrile has been added, the mixture is heated at 90° C. in the dark. In this case, the same type of segmented copolymer is obtained and no homopolymer of the methacrylonitrile is detected in the reaction mixture.

Example II

This example illustrates the use of the process of the invention in preparing a segmented copolymer made up of a segment of polymeric methyl methacrylate joined to polymeric vinyl chloride, and further demonstrates the unexpected nature of the results so obtained.

(A) About 50 parts of methyl methacrylate are mixed with 600 parts of water and 0.33% sodium lauryl sulfate and the mixture deoxygenated. The mixture is then heated at 50° C. in the dark until substantially all of the methyl methacrylate is polymerized. 50 parts of deoxygenated vinyl chloride are then slowly added to the reaction mixture at about the rate at which it is being consumed and the polymerization continued in the dark at 50° C. until substantially all of the vinyl chloride is polymerized. Analysis indicated that the resulting product is a copolymer made up of polymeric vinyl chloride. No homopolymer of vinyl chloride is detected in the reaction mixture.

(B) Vinyl chloride could not polymerize by itself under the above-described conditions so it was quite unexpected to find that it did polymerize in the presence of the methyl methacrylate polymer nuclei. The inability of the vinyl chloride to polymerize under the above conditions is demonstrated by the following experiment. 100 parts of vinyl chloride is placed in 600 parts of water and 0.33% sodium lauryl sulfate and the mixture deoxygenated. The mixture is then heated at 50° C. in the dark in the absence of oxygen for several days but no polymer is detected. Similar experiments conducted at about 100° C. indicate that the vinyl chloride could not polymerize by itself under the disclosed conditions even at that high a temperature.

As vinyl chloride could not have polymerized thermally under the above-described experimental conditions, its polymerization could be explained only by the fact that the vinyl chloride units were added to the active methyl methacrylate polymer nuclei.

(C) No such segmented polymers are obtained, however, if the process is reversed, i.e., if the vinyl chloride is polymerized first and the methyl methacrylate added. In this case, the resulting product is merely a mixture of homopolymers of each monomer which could be separated.

(D) The copolymer of polymeric methyl methacrylate and polymeric vinyl chloride produced in (A) above possesses good flexibility and in addition possesses many of the desirable characteristics of the polyvinyl chloride not possessed by the conventional copolymer of methyl methacrylate and vinyl chloride formed by mixing the monomers together at the beginning of the polymerization.

Example III

This example illustrates the use of the process of the invention in preparing a segmented copolymer made up of a segmented polymeric methacrylonitrile joined to polymeric acrylonitrile, and further demonstrates the unexpected nature of the results so obtained.

(A) About 100 parts of methacrylonitrile are mixed with 600 parts of water and 0.33% sodium lauryl sulfate, the mixture deoxygenated and then exposed to ultraviolet light at 60° C. until substantially all of the methacrylonitrile has been polymerized. 100 parts of acrylonitrile are then slowly added to the reaction mixture and the polymerization continued in the absence of light at 40° C. until the acrylonitrile is polymerized. Analysis indicated that the resulting product is a copolymer made up of 100 parts of polymeric methacrylonitrile joined to polymeric acrylonitrile. No homopolymer of acrylonitrile is detected in the product.

(B) Acrylonitrile could not polymerize by itself under the above-described conditions so it was unexpected to find that it did polymerize in the presence of the methacrylonitrile polymer nuclei. The inability of the acrylonitrile to polymerize under the above conditions is demonstrated by the following experiment. 100 parts of acrylonitrile is placed in 600 parts of water and 0.33% sodium lauryl sulfate and the mixture deoxygenated. The mixture is then heated at 40° C. in the dark in the absence of oxygen for several days but no polymer is formed during that period. Similar experiments conducted at about 100° C. indicate that the acrylonitrile could not homopolymerize under the disclosed conditions even under that high of a temperature.

(C) The experiment reported in (A) above is repeated with the exception that after the acrylonitrile has been added, the mixture is heated at 90° C. in the dark. In this case, the same type of segmented copolymer is obtained and no homopolymer of the acrylonitrile is detected in the reaction mixture.

(D) However, no such segmented copolymers are obtained if the process under (A) above is repeated with the exception that the acrylonitrile is polymerized first and then the methacrylonitrile added to the reaction mixture.

*Example IV*

About 50 parts of methyl methacrylate and 50 parts of methacrylonitrile are mixed with 600 parts of water and 0.33% sodium lauryl sulfate, the mixture deoxygenated and then irradiated with ultraviolet light until substantially all of the monomers are polymerized. 50 parts of deoxygenated acrylonitrile are then slowly added to the reaction mixture at about the same rate that it is being consumed, and the polymerization continued in the absence of the ultraviolet light at a temperature of about 40° C. The resulting product is a copolymer made up of a segment of a copolymer of methyl methacrylate and methacrylonitrile joined to a segment of polymeric acrylonitrile.

*Example V*

About 100 parts of methyl methacrylate are mixed with 600 parts of water and 0.5% sodium lauryl sulfate, the mixture deoxygenated and then heated to 75° C. until substantially all of the monomer has been polymerized. 100 parts of a deoxygenated mixture of equal parts of acrylonitrile and methacrylonitrile are then slowly added to the mixture and the polymerization continued at 50° C. in the dark. The resulting product is a copolymer made up of a segment of polymeric methyl methacrylate joined to a segment of a copolymer of acrylonitrile and methacrylonitrile.

*Example VI*

About 50 parts of methacrylonitrile are mixed with 600 parts of water and 0.33% sodium lauryl sulfate, the mixture deoxygenated and then exposed to ultraviolet light at 50° C. until substantially all of the monomer is polymerized. 50 parts of deoxygenated methyl methacrylate are then added and the polymerization continued at a temperature below 25° C. in the dark. When substantially all of the methyl methacrylate has been polymerized, 50 parts of deoxygenated acrylonitrile are slowly added to the mixture and the polymerization continued in the dark. The resulting product is a copolymer made up of a segment of polymeric methacrylonitrile which is joined to a segment of methyl methacrylate which, in turn, is joined to a segment of polyacrylonitrile.

*Example VII*

(A) About 100 parts of methacrylonitrile are mixed with 1 part of benzoyl peroxide and an equal volume of cyclohexane and the resulting mixture heated to about 65° C. until substantially all of the monomer is polymerized and the catalyst consumed. 50 parts of deoxygenated vinyl acetate are then slowly added and the polymerization continued at a temperature of about 30° C. in the dark. The resulting product is a copolymer made up of a segment of polymeric methacrylonitrile joined to a segment of polymeric vinyl acetate.

As vinyl acetate could not polymerize thermally under the above-described experimental conditions its polymerization could be explained only by the fact that the vinyl acetate units were added to the active methacrylonitrile polymer nuclei.

(B) The experiment reported in (A) above is repeated with the exception that after the vinyl acetate has been added, the mixture is heated at 90° C. in the dark. In this case, the same type of segmented copolymer is obtained.

*Example VIII*

About 100 parts of methyl isopropenyl ketone are mixed with 600 parts of water, 0.33% sodium lauryl sulfate, the mixture exposed to ultraviolet light at 60° C. to polymerize the methyl isopropenyl ketone. 60 parts of deoxygenated methacrylonitrile are then added and the polymerization continued at about 50° C. in the dark. The resulting product is a copolymer of 100 parts of polymeric methyl isopropenyl ketone and polymeric methacrylonitrile. No homopolymer of methacrylonitrile was detected in the reaction mixture.

Related segmented copolymers are obtained by replacing the methyl isopropenyl ketone in the above process with equivalent amounts of each of the following: isopropenyl butyl ether and isopropenyl hexyl ether.

*Example IX*

About 100 parts of methyl alpha-chloroacrylate are mixed with 500 parts of water, 0.33% sodium lauryl sulfate and 0.5% potassium persulfate and the mixture deoxygenated. This mixture is then heated to 70° C. until substantially all of the monomer has been polymerized. 100 parts of acrylonitrile are then added and the polymerization continued at a temperature of about 50° C. in the dark. The resulting product is a copolymer made up of a segment of methyl alpha-chloroacrylate joined to a segment of acrylonitrile.

*Example X*

About 100 parts of methacrylamide are mixed with 600 parts of water, 0.33% sodium lauryl sulfate, the mixture deoxygenated and irradiated with ultraviolet light at 30° C. to polymerize the methacrylamide. When all of the methacrylamide has been polymerized, 75 parts of dioctyl maleate is added and the polymerization continued in the dark at about 40° C. The resulting product is a copolymer made up of a segment of polymethacrylamide joined to a segment of poly(dioctyl maleate).

Copolymers having related properties are obtained by replacing the methacrylamide in the above process with equivalent amounts of each of the following: N-butyl methacrylamide and N,N-dibutyl methacrylamide.

*Example XI*

About 100 parts of methyl alpha-chloroacrylate are mixed with 600 parts of water, 0.33% sodium lauryl sulfate, 0.75 part of potassium persulfate, the mixture deoxygenated and heated to 75° C. to polymerize all of the said monomer. About 75 parts of deoxygenated lauryl acrylate and the mixture maintained in the dark at 50° C. The resulting product is a copolymer made up of a segment of poly(methyl alpha-chloroacrylate) joined to a segment of poly(lauryl acrylate).

*Example XII*

A segmented copolymer is obtained by polymerizing 100 parts of chloroprene in 600 parts of water, 0.33% sodium lauryl sulfate and 0.75 part of potassium persulfate at 60° C. until chloroprene is polymerized, and then adding 50 parts of acrylonitrile and continuing the polymerization at 45° C.

This application is a continuation-in-part of my application Ser. No. 92,089, filed May 7, 1949, now abandoned.

I claim as my invention:

1. A process for preparing segmented copolymers which consists essentially of adding in the absence of any further addition of polymerization catalyst, (A) a nonthermally polymerizable monoethylenically unsaturated monomer which monomer does not form products having more than 2 units of monomer when exposed in the pure state in the absence of molecular oxygen and any polymerization catalyst and which monomer is substantially free of oxygen to a temperature up to 100° C., to (B) a freshly prepared composition which has been obtained by polymerizing, in the substantial absence of molecular oxygen and until there is substantially no unpolymerized monomer remaining, a special ethylenically unsaturated monomer which is dissimilar to the monomer used in (A) above and is a member of the group consisting of (1) monomers of the formula $$CH_2=\overset{X}{\underset{|}{C}}-Y$$

wherein X is a halogen and Y is a member of the group consisting of $$-(CH_2)_nO\overset{O}{\overset{\|}{C}}R$$

$$-(CH_2)_n\overset{O}{\overset{\|}{C}}OR$$

$$-(CH_2)_nCN$$

$$-(CH_2)_n\overset{O}{\overset{\|}{C}}R$$

$$-(CH_2)_n\overset{O}{\overset{\|}{C}}NH_2$$

$$-(CH_2)_n\overset{OH}{\overset{|}{\underset{\|}{C}}}NR$$

and $-(CH_2)_nOR$ wherein R is an alkyl radical and $n$ is an integer from 0 to 5, (2) monomers of the formula $$CH_2=\overset{X}{\underset{|}{C}}-Y$$

wherein X is an alkyl radical and Y is as described under (1) above, and (3) monomers having a terminal methylene group joined to an aliphatic carbon atom through an ethylenic linkage which is in conjugated relationship with another ethylenic linkage, the aforedescribed monomers in (B) being capable of forming polymer long-lived free radicals, in a liquid medium which is a poor solvent for the polymer of monomers described in (B) and maintaining the mixture of (A) and (B) in the dark at a temperature below 100° C., in the substantial absence of molecular oxygen, until the monomer (A) has been polymerized.

2. A process as defined in claim 1 wherein composition (B) is obtained by polymerizing the special ethylenically unsaturated monomers in an aqueous emulsion at a temperature between 40° C. and 100° C.

3. The process of claim 1 wherein composition (B) is obtained by exposing an aqueous emulsion containing the special ethylenically unsaturated monomer to ultraviolet light.

4. The process of claim 1 wherein composition (B) is obtained by exposing the special ethylenically unsaturated monomer to ultraviolet light in an aqueous emulsion containing 0.1% to 1% of emulsifying agent based on the weight of the monomer content.

5. A process as in claim 1 wherein the monomer (A) is an alpha,beta ethylenically unsaturated nitrile.

6. A process as in claim 1 wherein the monomer (A) is a vinyl halide.

7. A process as in claim 1 wherein the monomer (A) is a dialkyl ester of maleic acid.

8. A process as in claim 1 wherein the monomer (A) is vinyl ester of a saturated monocarboxylic acid.

9. A process as in claim 1 wherein the composition (B) is obtained by heating at 40° C. to 100° C. an aqueous emulsion containing the said special ethylenically unsaturated monomer and not more than 1.5% of a polymerization catalyst based on the weight of the special ethylenically unsaturated monomer.

10. A process as in claim 1 wherein the special ethylenically unsaturated monomer is methacrylonitrile.

11. A process as in claim 1 wherein the special ethylenically unsaturated monomer is methyl methacrylate.

12. A process as in claim 1 wherein the special ethylenically unsaturated monomer is methyl alpha-chloroacrylate.

13. A process as in claim 1 wherein the monomer (A) is acrylonitrile.

14. A process as in claim 1 wherein the monomer (A) is methacrylonitrile.

15. A process as in claim 1 wherein the monomer (A) is vinyl chloride.

16. A process as in claim 1 wherein the monomer (A) is vinyl acetate.

17. A process as in claim 1 wherein the non-thermally polymerizable unsaturated monomer in (A) is a member of the group consisting of acrylonitrile, methacrylonitrile, ethacrylonitrile, vinyl chloride, vinyl acetate, vinyl caproate, vinyl stearate, octene-1, butylene, allyl acetate, allyl butyrate, diethyl maleate, dibutyl maleate, dioctyl maleate, octyl lauryl maleate, lauryl acrylate, allyl methyl phthalate, vinyl butyl succinate.

References Cited in the file of this patent

UNITED STATES PATENTS

| | | |
|---|---|---|
| 1,938,730 | Tschunkur et al. | Dec. 12, 1933 |
| 2,356,091 | Roedel | Aug. 15, 1944 |
| 2,388,685 | Guss et al. | Nov. 13, 1945 |
| 2,460,300 | Le Fevre et al. | Feb. 1, 1949 |
| 2,610,962 | Smyers et al. | Sept. 16, 1952 |
| 2,614,089 | Harrison et al. | Oct. 14, 1952 |
| 2,666,025 | Nozaki | Jan. 12, 1954 |
| 2,666,042 | Nozaki | Jan. 12, 1954 |

OTHER REFERENCES

Blout et al.: "Monomers." section on "Vinyl Chloride," page 28, published 1949 by Interscience Pub., Inc., New York.